(12) United States Patent
Oktavec et al.

(10) Patent No.: US 6,742,425 B2
(45) Date of Patent: Jun. 1, 2004

(54) DUST COLLECTOR

(75) Inventors: Craig A. Oktavec, Forest Hill, MD (US); Mark E. Brunson, Bel Air, MD (US); Adan Ayala, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/145,679

(22) Filed: May 15, 2002

(65) Prior Publication Data

US 2002/0189415 A1 Dec. 19, 2002

Related U.S. Application Data

(60) Provisional application No. 60/298,182, filed on Jun. 14, 2001.

(51) Int. Cl.$^7$ ............................................. B23D 45/02
(52) U.S. Cl. ............................ 83/100; 83/473; 83/485
(58) Field of Search ........................ 83/100, 478, 490, 83/473, 471.3, 168, 485; 451/456; 409/137

(56) References Cited

U.S. PATENT DOCUMENTS

| | | | | |
|---|---|---|---|---|
| 2,879,530 A | * | 3/1959 | Ego ........................... | 15/104.8 |
| 4,144,781 A | * | 3/1979 | Kreitz ........................ | 83/100 |
| 4,434,519 A | * | 3/1984 | Raubenheimer .............. | 15/1.7 |
| 4,515,504 A | | 5/1985 | Moore | |
| 4,576,072 A | * | 3/1986 | Terpstra et al. ............ | 83/102.1 |
| 5,445,056 A | * | 8/1995 | Folci ......................... | 83/100 |
| 5,594,972 A | | 1/1997 | Iversen | |
| 5,653,561 A | * | 8/1997 | May ........................... | 408/67 |
| 6,122,797 A | * | 9/2000 | Vanderlinden ................ | 15/346 |
| 6,427,570 B1 | * | 8/2002 | Miller et al. ................. | 83/100 |
| 6,470,778 B1 | * | 10/2002 | Kaye et al. .................... | 83/100 |
| 6,510,772 B2 | * | 1/2003 | Brickner et al. .............. | 83/100 |

FOREIGN PATENT DOCUMENTS

| | | | |
|---|---|---|---|
| DE | 3136590 | * | 3/1983 |
| DE | 8815327.4 | * | 3/1989 |
| DE | 10036426 | | 6/2001 |
| IT | 1133993 | * | 10/1980 |

OTHER PUBLICATIONS

J. De Gussem, European Search Report and Annex to the European Search Report, Mar. 7, 2003, The Hague.

* cited by examiner

Primary Examiner—Kenneth E. Peterson
(74) Attorney, Agent, or Firm—Adan Ayala

(57) ABSTRACT

An improved dust collector is proposed. The dust collector comprises an upper duct, and a flexible lower flap connected to the upper dust duct, wherein the lower flap is resilient. Preferably, the upper duct has a substantially U-shaped cross-section, whereas the bottom of the duct is open. The lower flap is disposed in the open portion of the inlet. Furthermore, the upper duct inlet and outlet may have corresponding centerlines, whereas the centerline of the upper duct outlet may be offset from the centerline of the upper duct inlet by a predetermined number of degrees, e.g., about 15°. In addition, the dust collector may further include a wire for maintaining the lower flap in an open position.

10 Claims, 2 Drawing Sheets

DUST COLLECTOR

CROSS-REFERENCE TO RELATED APPLICATIONS

This application derives priority under 35 USC § 119(e) from U.S. Application Serial No. 60/298,182, filed Jun. 14, 2001, now abandoned.

BACKGROUND OF THE INVENTION

The present invention relates to dust collection mechanisms for use with chop saws.

Chop saws are power tools that have a saw assembly pivotally mounted to base or table. The user can then move the saw assembly downwardly in a chopping action to cut a workpiece. One type of chop saw is the sliding chop saw, which has a saw assembly slideably connected to the table so that the saw assembly can move along a horizontal direction, increasing the cutting capacity of the chop saw.

It is preferable to provide a dust collection mechanism for the sliding chop saw to collect any dust resulting from the cutting operation. Prior art solutions include disposing the dust collection mechanism on the table or base. This dust collector remains stationary on the table, even though the sliding saw assembly would move towards and away from the dust collector.

Another prior art solution proposes disposing a dust collector on the sliding saw assembly so that the dust collector remains stationary relative to the saw assembly. However, typical prior art solutions may not collect large amounts of the dust because of their location on the sliding saw assembly.

SUMMARY OF THE INVENTION

An improved dust collector is proposed. The dust collector comprises an upper duct, and a flexible lower flap connected to the upper dust duct, wherein the lower flap is resilient. Preferably, the upper duct has a substantially U-shaped cross-section, whereas the bottom of the duct is open. The lower flap is disposed in the open portion of the inlet.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
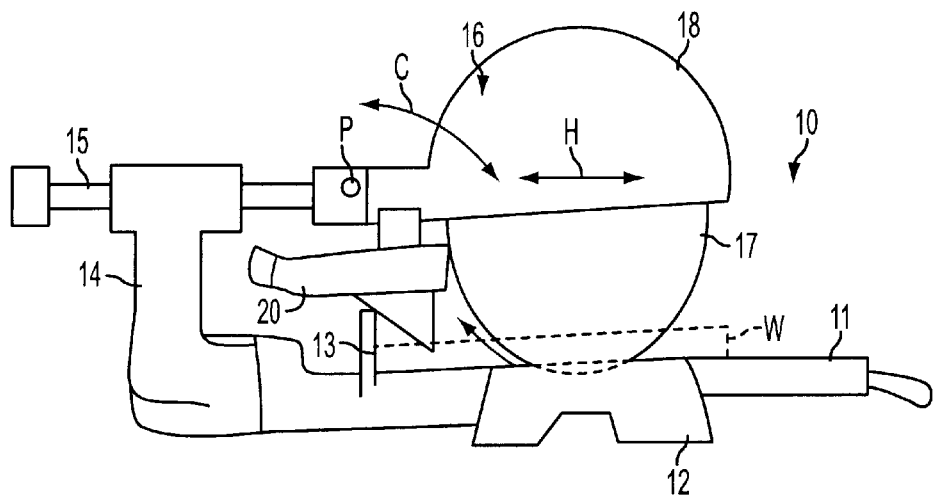
FIG. 1 illustrates a sliding chop saw including the dust collector assembly according to the present invention.

Referring to FIG. 1, chop saw 10 is shown with the dust collector assembly 20 according to the present invention.

Persons skilled in the art should recognize that FIG. 1 illustrates a sliding miter saw, but they should also recognize that this invention can be implemented in any other type of chop saw and/or power tools.

Slide miter saw 10 includes a table 11 rotatably disposed on a base 12. Table 11 may have a fence 13. In addition, support arm housing 14 may be rotatably connected to table 11. Arm housing 14 slideably receives slidable rails 15, which are in turn connected to saw assembly 16. The saw assembly preferably includes an upper blade guard 18, a motor (not shown) connected to the upper blade guard 18, and a blade 17 driven by the motor. Preferably, saw assembly 16 pivots about pivot P, allowing the user to move the saw assembly 16 along chopping direction C.

Persons skilled in the art shall recognize that connecting the saw assembly 16 to arm housing 14 via rails 15 allow the user to move the saw assembly 16 along a horizontal direction H. Persons skilled in the art should also recognize that other arrangements are available to achieve the same function. For example, rails 15 may be attached to arm housing 14, so that the saw assembly 16 can slide along the rails 15. Alternatively, the saw assembly 16 may be fixedly connected to the arm housing 14, which in turn may be fixedly connected to rails 15. Rails 15 then slide underneath table 11.

Referring to FIGS. 2–5, miter saw 10 may also include a dust collection assembly 20. Dust collection assembly 20 may include post 22 for connecting the dust collection assembly 20 to upper blade guard 18. Post 22 may have ribs 22R for increasing the strength of the post 22. Post 22 is preferably connected to dust duct 21.

Preferably, dust duct 21 is made of ABS or XENOY plastic, or any other suitable material. Dust duct 21 may have an inlet 21I for receiving dust resulting from the cutting operation and an outlet 21O for exiting the dust. Persons skilled in the art should recognize that a dust collection bag and/or hose (which may be connected to a vacuum source) can be connected to the outlet 21O.

Preferably, dust duct 21 is manufactured of two clam shells 21L, 21R which are held together by screws 21S.

Preferably, the cross section of inlet 21I is substantially U-shaped opening downwardly. On the other hand, the cross section of outlet 21O may be substantially circular and closed. Preferably, the diameter of outlet 21O is about 35 millimeters.

Persons skilled in the art will recognize that the width of inlet 21I is preferably narrower than the width of the outlet 21O. In addition, persons skilled in the art will recognize that the centerline OC of outlet 21O may be offset from the centerline IC of inlet 21I and/or the dust duct 21. In particular, it is preferable to have an angle VA between centerlines IC, OC along the vertical axis. Such angle VA is preferably about 15 degrees. Furthermore, an angle HA between lines IC and OC along the horizontal axis is preferably is about 10 degrees.

A dust flap 23 may be disposed underneath dust duct 21.

Dust flap 23 may be made of a rubberized fabric that is resilient, such as neoprene-coated nylon. Preferably, the dust flap will be manufactured of Reevecote 18403.

Figure 5:
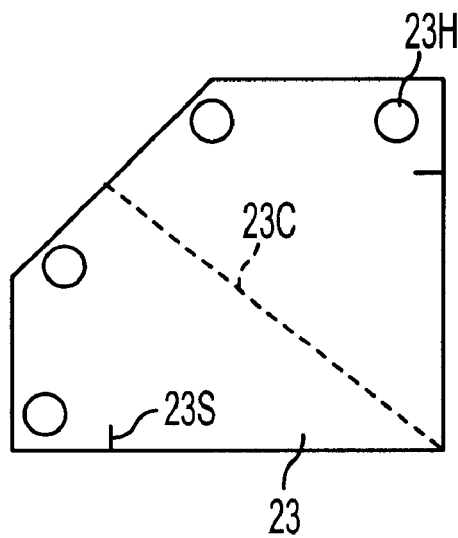
FIG. 5 shows an unfolded dust flap.

As shown in FIG. 5, the dust flap 23 may be a pentagon that is substantially symmetrical about its centerline 23C. Dust flap 23 is folded and disposed between halves 21L, 21R. Bosses 22B provided on halves 21L, 21R extend through holes 23H and dust flap 23, holding the dust flap in place. Dust flap 23 may be disposed in the open portion of the inlet 21I, thus resulting in a substantially closed cross-section 21IA. The width and height of cross-section 21IA may be about 14 millimeters and about 150 millimeters, respectively.

The area of cross-section 21IA may be at least about 1.5 times the cross-sectional area of outlet 21O. Preferably, the area of cross-section 21IA is about 1.5–2 times the cross-sectional area of outlet 21O. Preferably, the area of cross-section 21IA is about 1568 squared millimeters, whereas the cross-sectional area of outlet 21O is about 960.2 squared millimeters.

Persons skilled in the art will recognize that the shape of the folded dust flap 23 extending from the dust duct 21 is substantially triangular.

Persons skilled in the art should recognize that providing a dust flap 23 of resilient material, such as rubberized fabric, allows the dust flap 23 to slide along a workpiece W or fold when moving past fence 13, and then substantially return to its original form.

Figure 2:
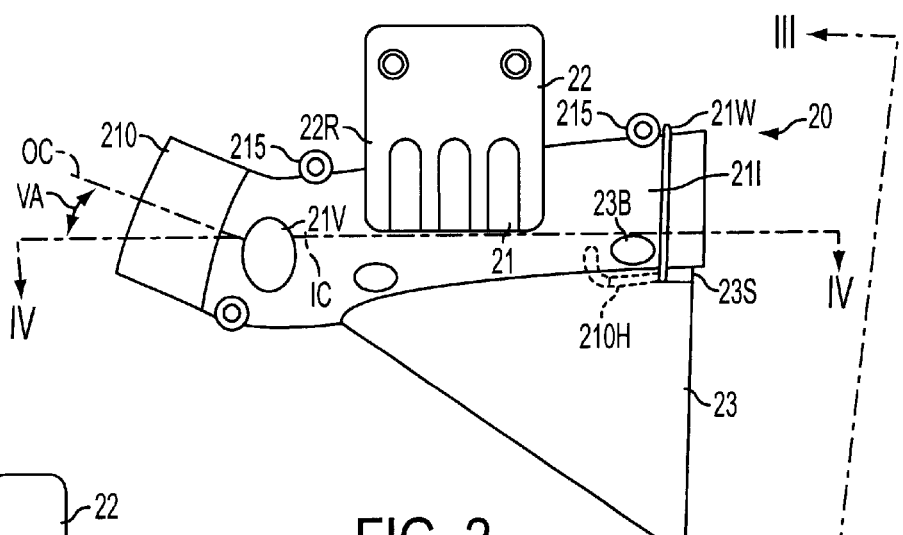
FIG. 2 illustrates the dust collection assembly of the present invention.

Dust duct 21 may also have a wire 21W for holding the dust flap 23 open. Preferably, the wire 21W extends downwardly around dust duct 21, extends through dust flap 23, then hooks around the inside of dust duct 21, as shown in FIG. 2. Wire 21W may extend through a hole or slot 23S on dust flap 23. In addition, wire 21W may hook around the inside of dust duct 21 via a hook portion 21WH.

Persons skilled in the art will recognize that the wire 21W may be shaped to increase the width of cross-section 21IA. Accordingly, the area of cross-section 21IA may be at least 1.5 times (and preferably about 3 times) the cross-sectional area of outlet 21O.

Persons skilled in the art will recognize that the dust flap 23 may shut or close itself if a vacuum hose is connected to the outlet 21O which is in turn connected to a strong vacuum source. The wire 21W however may hold open dust flap 23, allowing for proper dust collection.

Figure 3:
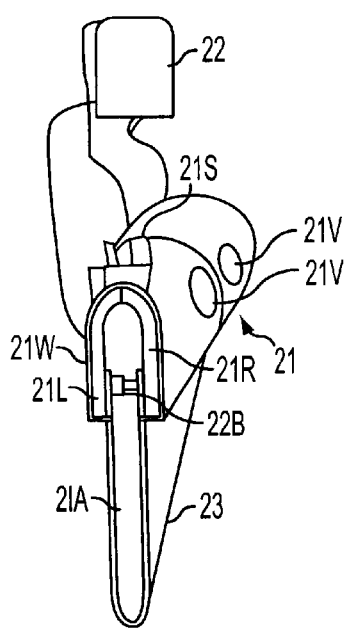
FIG. 3 shows the dust collector assembly of FIG. 2 along lines III—III.
Figure 4:
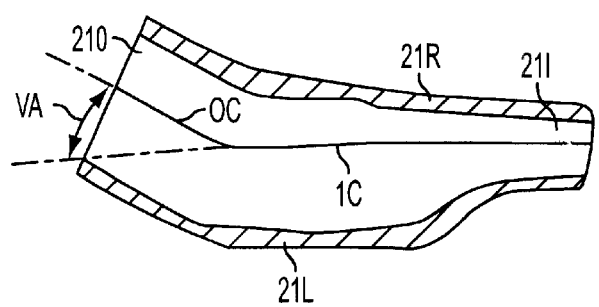
FIG. 4 is a cross section of the dust collector FIG. 2 along line IV—IV.
Figure 6:
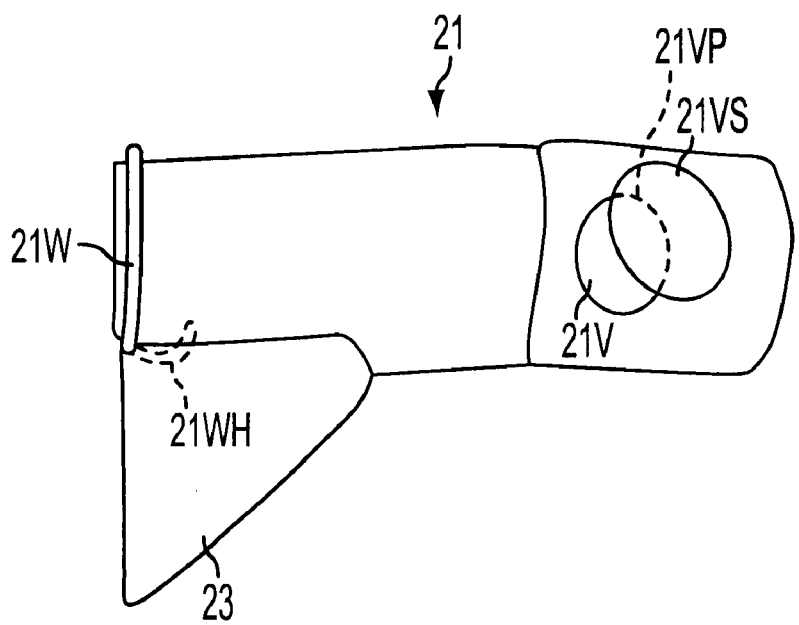
FIG. 6 illustrates a second embodiment of the present invention.

It may also be advantageous to provide a vent 21V on dust duct 21 to allow ambient air to enter dust duct 21 and supplement the exiting air flow. Vent 21V may be provided on either side of dust duct 21 (as shown in FIGS. 2–3) and/or on the horizontal portion or angled portion of dust duct 21 (as shown in FIG. 3). Preferably, the area of vent 21V is about 0.39 square inches.

Furthermore, a flap 21VS may be pivotally attached to dust duct 21 via pivot 21VP. Flap 21VS can be adjusted to cover all, none or a portion of the vent 21V. Accordingly, a user can adjust flap 21VS to minimize or maximize ambient air entering dust duct 21 depending upon the strength of the vacuum source.

Persons skilled in the art may recognize other alternatives to the means disclosed herein. However, all these additions and/or alterations are considered to be equivalents of the present invention.

We claim:

1. A power tool comprising:
    a housing;
    a cutting tool supported by the housing; and
    a workpiece support portion for positioning a workpiece to be cut,
    a dust collector supported by the housing, the dust collector comprising
        an upper duct having a bottom portion defining an open area, an inlet and an outlet, said inlet being in a first plane, the first plane being substantially vertical, and said open area being in a second plane, the first and second planes intersecting, and
        a flexible lower flap connected to the upper duct, the lower flap disposed partly underneath the bottom portion and substantially covering the open area, such that said flexible lower flap is resiliently deformable against an upper surface of a workpiece positioned on said workpiece support portion,
        wherein the lower flap and the upper duct inlet define a collector inlet which is larger than the upper duct outlet.

2. The power tool of claim 1, further comprising a post attached to upper duct for connecting the upper duct to the power tool.

3. The power tool of claim 1, wherein the upper duck inlet has a substantially U-shaped cross-section.

4. The power tool of claim 1, further comprising a wire for maintaining the lower flap in an open position.

5. The power tool of claim 1, wherein the upper duct outlet has a substantially circular cross-section.

6. The power tool of claim 1, wherein area of the upper duct inlet and the lower flap in an open position is at least 1.5 times area of the upper duct outlet.

7. The power tool of claim 1, wherein the upper duct inlet and outlet have corresponding centerlines, and the centerline of the upper duct outlet is offset from the centerline of the upper duct inlet by a predetermined number of degrees.

8. The power tool of claim 7, wherein the predetermined number of degrees is about 15°.

9. The power tool of claim 1, wherein the upper duct has a vent.

10. The power tool of claim 9, further comprising a flap attached to the upper duct for covering at least a portion of the vent.

* * * * *